United States Patent [19]

Hohenecker

[11] Patent Number: 4,898,453
[45] Date of Patent: Feb. 6, 1990

[54] MACROLENS ASSEMBLY HAVING A DISTANCE ADJUSTMENT OF MORE THAN 360 DEGREES

[75] Inventor: Harald Hohenecker, Vienna, Austria

[73] Assignee: Aari Cine & Video Gerate Gesellschaft M.b.H., Vienna, Austria

[21] Appl. No.: 231,483

[22] Filed: Aug. 12, 1988

[30] Foreign Application Priority Data

Mar. 16, 1988 [AT] Austria .................................. 706/88

[51] Int. Cl.$^4$ ............................................... G02B 7/02
[52] U.S. Cl. ...................................... 350/255; 350/252
[58] Field of Search ............... 350/255, 252, 247, 257; 354/195.1, 195.13

[56] References Cited

U.S. PATENT DOCUMENTS

| | | | |
|---|---|---|---|
| 4,496,217 | 1/1985 | Aoyagi | 350/255 |
| 4,707,083 | 11/1987 | Iizuka et al. | 350/255 |
| 4,763,987 | 8/1988 | Ando | 350/255 |

FOREIGN PATENT DOCUMENTS

| | | | |
|---|---|---|---|
| 973996 | 9/1960 | Fed. Rep. of Germany | 350/255 |
| 6082609 | 6/1985 | Japan | 350/255 |

Primary Examiner—Bruce Y. Arnold
Assistant Examiner—Loha Ben
Attorney, Agent, or Firm—Cushman, Darby & Cushman

[57] ABSTRACT

A macrolens assembly which has two distance setting rings which are coaxially arranged and are fitted into each other and each of which has on its radial exterior a distance scale. A control window is provided in the lens mount and in the outermost distance setting ring directly abutting there against in radial direction. The inner distance setting ring which can be rotated manually by means of a driving ring can be coupled to the outer distance setting ring by a driver formed as a ball catch. In this way, after one rotation of the driving ring, first the scale on the outer distance setting ring, when the scale on the inner distance setting, becomes visible.

15 Claims, 15 Drawing Sheets

MACROLENS ASSEMBLY HAVING A DISTANCE ADJUSTMENT OF MORE THAN 360 DEGREES

BACKGROUND OF THE INVENTION

The invention relates to a macrolens assembly with a lens mount including a lens system, and in which is rotatively supported a distance setting ring with a scale mounted coaxially to the lens axis.

In macrolenses it has been conventional to set the focus distance using a distance setting ring. Because it is necessary to design the distance setting ring in such a way that it can be rotated more than 360°, it is a common practice to make the distance scale in different colors placed opposite to a multicolored index mark. This creates the problem that the colors must be assigned correctly when setting the distance setting ring. Faulty focusing becomes possible especially when trying to quickly set the lens with relatively little concentration. This also provides difficulty under poor light conditions, because of the reduced color perception of the human eye.

In recognition of this problem, the present invention has as its object the provision of a macrolens with which with relatively little increased technical effort the distances can be set with precision throughout the entire range.

According to the invention, this object is achieved by providing at least two distance setting rings arranged inside the mount and fitted into each other. Only the radially innermost distance setting ring is guided from exteriorly of the mount, through an annular opening therein, to form a driving ring. The distance setting rings adjacent to the innermost distance setting ring are rotatively connected to the innermost distance ring by means of a driver that can be automatically released by a radial pressure. Both the lens mount and the distance setting rings adjacent to the radially innermost distance setting ring are each provided with a control window. Transition and easy changing from one distance setting ring to the next is possible with this solution, which uses a relatively simple design. In this way, only one distance measurement is ever visible from the control window, this distance being always advantageously assigned to the index mark. Thus faulty settings are harder to make, even if the distance setting ring is activated hastily and with little concentration.

Another advantage is that a more practical gradation of colors of the distance range becomes now possible. For example, the distance setting rings in the range from infinite to one meter may be colored blue, green in the adjoining range, and red in the very special macrorange. This makes very fast spotting of the desired distance range possible, followed by an accurate focusing.

An advantageous modification of the invention consists in providing one stop each on the radially innermost distance ring, on its radial exterior and on the interior of the mount, which stops are staggered towards each other in a tangential direction at a distance corresponding to the tangential width of the control windows, whereby the driver connected to the second distance setting ring is provided between these two stops. The start of the distance scale on the radially outer ring is provided with this construction. The latter is carried along by the driver from the radially inner distance setting ring, which can be rotated by the driving ring provided on the exterior mounts. After a 360° rotation minus the tangential width of the control window there appears in the radially outer distance ring another control window, so that the scale on the radially inner distance ring now becomes visible. The radially outer distance ring is held in position by the stop of the driver on the stop connected to the interior of the mount, and the distance scale continues smoothly on the inner distance ring.

According to the invention, the control windows in another preferred embodiment of the invention are staggered one directly behind the other in the direction of the radial exterior of the distance rings for the installation of the scale.

According to another advantageous variant of the invention, provision is made for the construction of the driver as a ball catch, which acts bilaterally in the radial direction and which, in the initial position of rotation determined by the contact of the two stops with the driver, locks into a first notch of the radially innermost distance ring, and into another notch provided on the interior of the mount is staggered in relation to the first notch at a tangential distance corresponding to the width of the control windows. In this way, the initial position of the driving ring is fixed by a non-passable stop. Thus, the activation of the driving ring for distance setting is possible in only one direction, whereby the stop of the radially inner distance ring is moved away from the stop of the lens mount. By appropriately spacing the two notches from each other, it is ensured that, after one rotation, the control window of the radially outer distance ring is located exactly beneath the control window arranged in the lens mount.

According to another embodiment of the invention, the driver may advantageously be formed as a permanent magnet, which, together with its pole pieces, is connected to the distance ring adjacent to the mount and cooperates with air guides from ferromagnetic material, which are mounted on the stops connected to the interior of the mount, or to the radially innermost distance ring. Such a notch-free driver is relatively simple to make and is practically trouble-free.

Finally, another advantageous embodiment of the invention is obtained by providing three distance rings, each of which is rotatively connected by means of drivers to the radially innermost distance ring. Such a structural approach makes an extremely high scale resolution possible, so that a highly accurate distance setting can be carried out.

BRIEF DESCRIPTION OF THE DRAWINGS

The invention will now be described more fully by reference to embodiments in conjunction with the accompanying drawings in which.

DESCRIPTION OF THE PREFERRED EMBODIMENT

Figure 1:
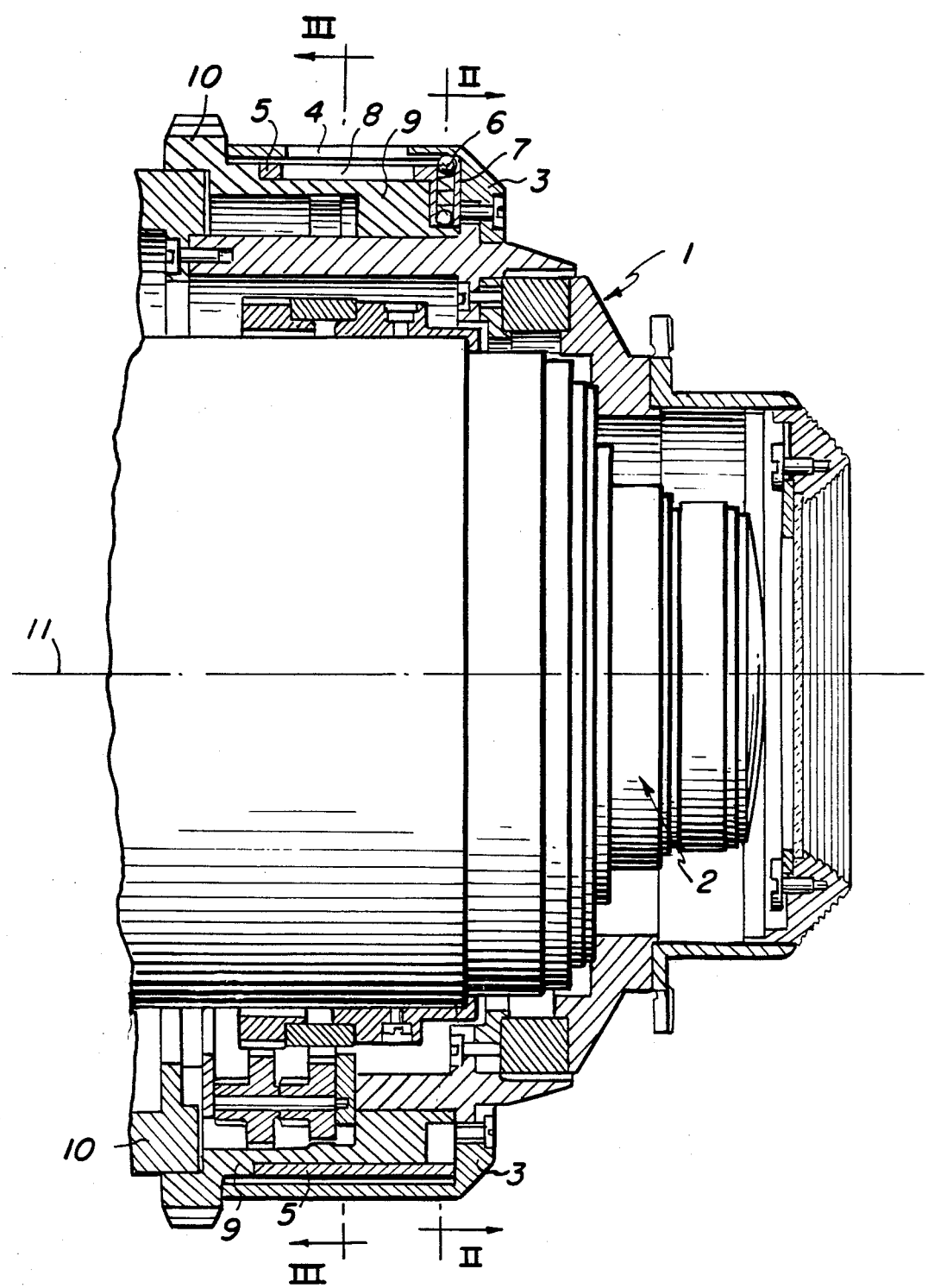
FIG. 1 is a longitudinal view of a macrolens assembly embodying the invention.

The macrolens assembly 1 depicted in FIG. 1 includes a mount 3 containing a lens system 2 which is not shown in detail and has a control window 4. Directly beneath the mount 3, a radially outer distance setting ring 5 is provided with a driver 7 that is formed as a ball catch 6 rigidly coupled thereto. Another distance setting ring is provided inside this distance setting ring 5, having a control window 8 and a distance scale on its radial exterior. This radially inner distance setting ring 9 can be rotated manually by means of a driving ring 10.

Figure 2:
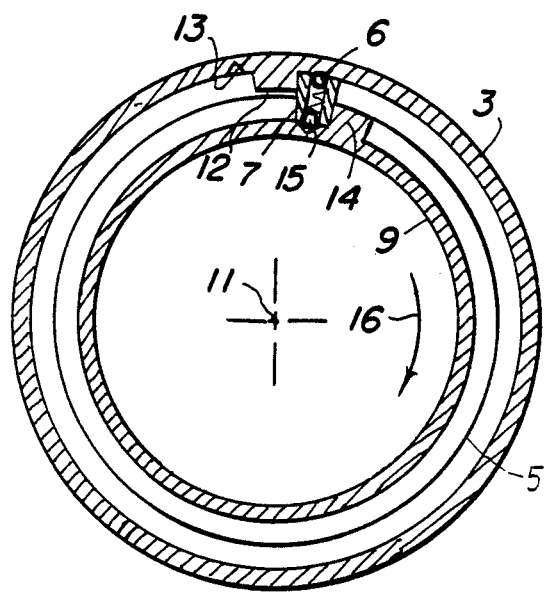
FIGS. 2, 4 and 6 are schematic cross-sectional views of the macrolens assembly incorporating the invention taken along line II in FIG. 1.
Figure 3:
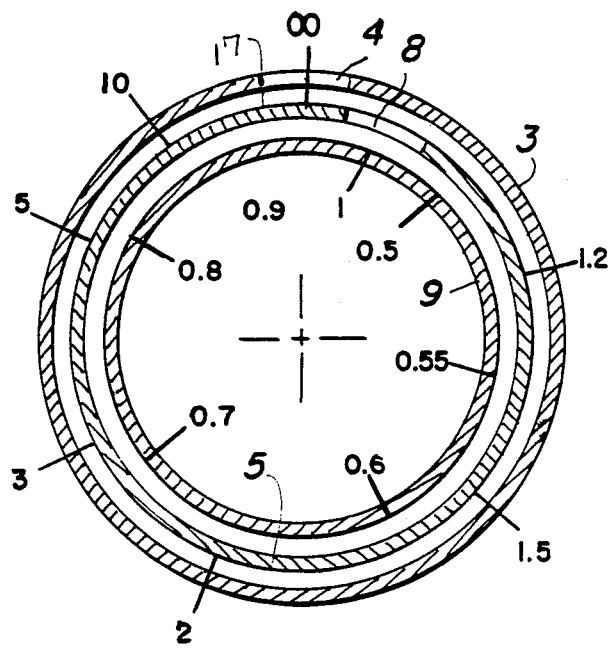
FIGS. 3, 5 and 7 are cross-sectional views of the macrolens assembly taken along line III in FIG. 1.

As can particularly be seen from FIGS. 2 to 7, the two distance setting rings 5 and 9 are arranged coaxially to the lens axis 11. The lens mount 3 has interior faces defining a stop 12 and a concave notch 13. The radially inner distance setting ring 9 has an exterior face defining a stop 14 as well as concave notch 15. FIG. 2 shows the initial position of rotation in which the two stops 12 and 14 each abut against driver 7. In this initial position of rotation, the inner distance setting ring 9 can rotate by means of driving ring 10 only in the direction indicated by arrow 16.

Figure 4:
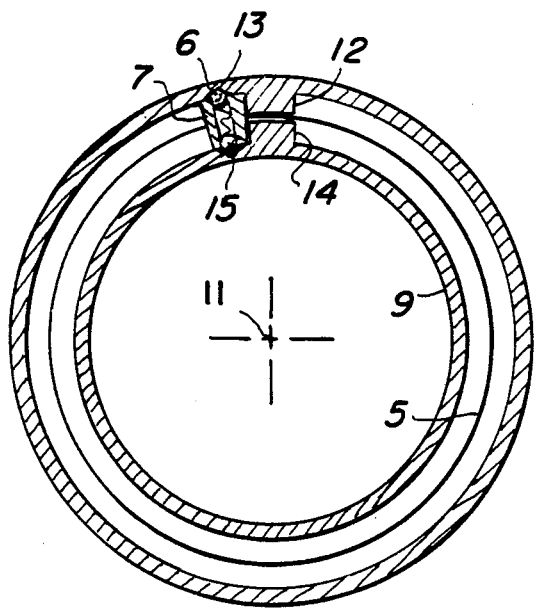
Figure 5:
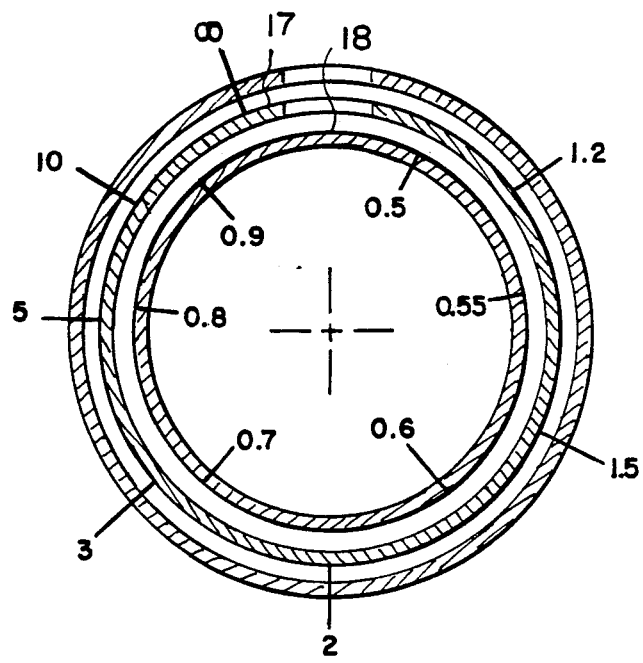

Distance setting is effected from the position in FIG. 2 by rotating the driving ring 10, and thereby the radially inner distance setting ring 9, in the direction of arrow 16. The ball catch is rigidly coupled to outer distance setting ring 5, to move along therewith. Ball catch 6 is initially connected into notch 15 and is carried along together with the radially outer distance setting ring 5. As can particularly be seen in FIG. 3, the distance scale 17 mounted on the radial exterior of the outer distance setting ring 5 appears in the control window 4 of lens mount 3. After one rotation of slightly less than 360°, the radially outer ball catch 6 locks into notch 13 of mount 3 and, at the same time, also abuts against stop 12 of mount 3 as shown in FIG. 4. In this position, as shown in FIG. 5, control window 8 of outer distance setting ring 5 is placed in coincidence beneath control window 4 of mount 3. Distance scale 18 on the radial exterior of inner distance setting ring 9 becomes visible in this configuration. Since inner ring 5 is locked into position, the scale 18 remains visible.

Figure 6:
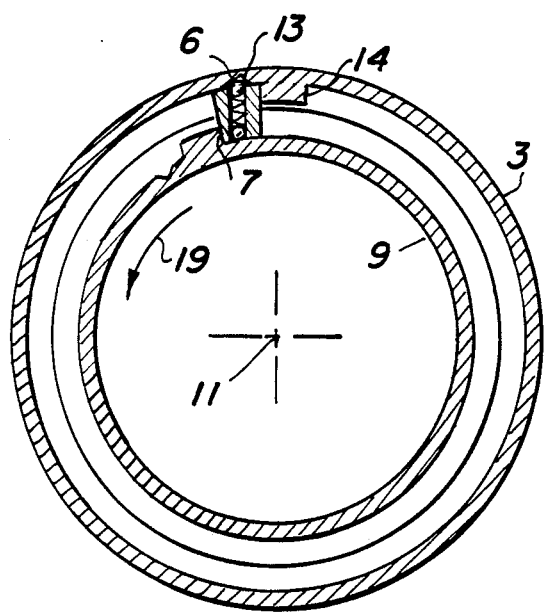
Figure 7:
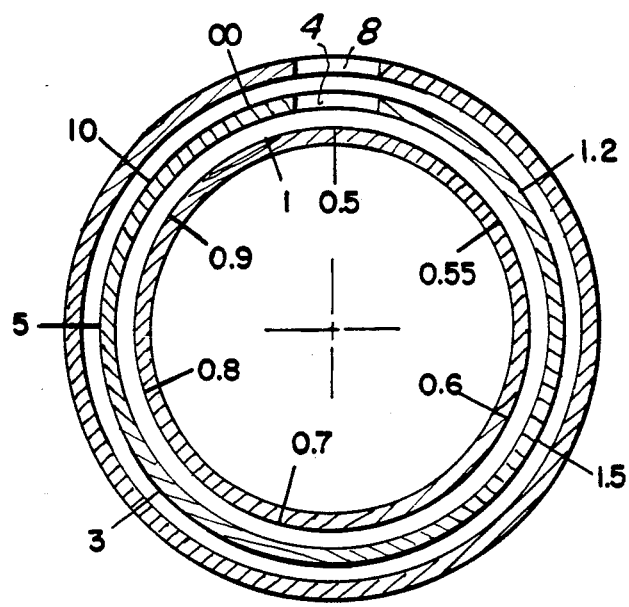

If distance setting ring 9 is further rotated in the direction of arrow 16, the radially inner ball catch 6 of driver 7 disengages from notch 15, thereby allowing only inner distance setting ring 9 to move. FIG. 6 depicts the final position of rotation in which the end of scale 18 is reached and stop 14 of inner distance setting ring 9 abuts against structure 7, which also abuts against stop 12 of mount 3.

If driving ring 10 is now rotated back in the direction indicated by arrow 19 (FIG. 6); which is opposite to the direction of rotation discussed above, driver 7 and therefore the radially outer distance setting ring 5 remains locked into notch 13 of mount 3 by means of the radially outer ball catch, and thus remains fixed therein until notch 15 of inner distance setting ring 9 locks into ball catch 6 and thereby carries outer distance setting ring 5 along therewith.

Figure 8A:
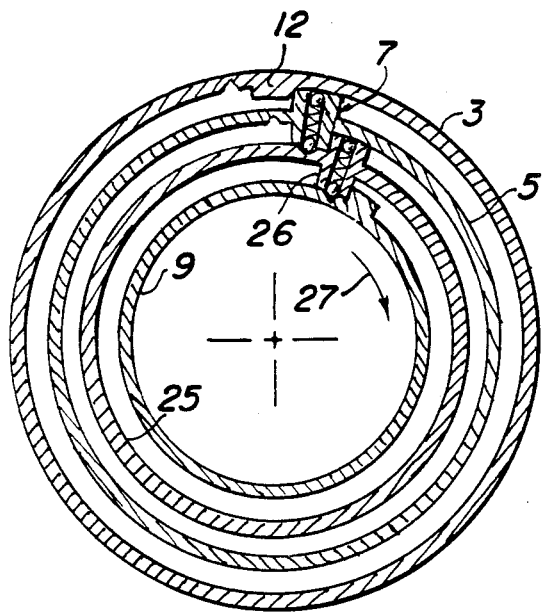
FIGS. 8A, 8B, 9A, 9B, 10A, 10B, 11A and 11B are schematic cross-sectional views of another embodiment of the macrolens assembly in accordance with the invention, having three distance, setting rings that can be rotated relative to one another.
Figure 8B:
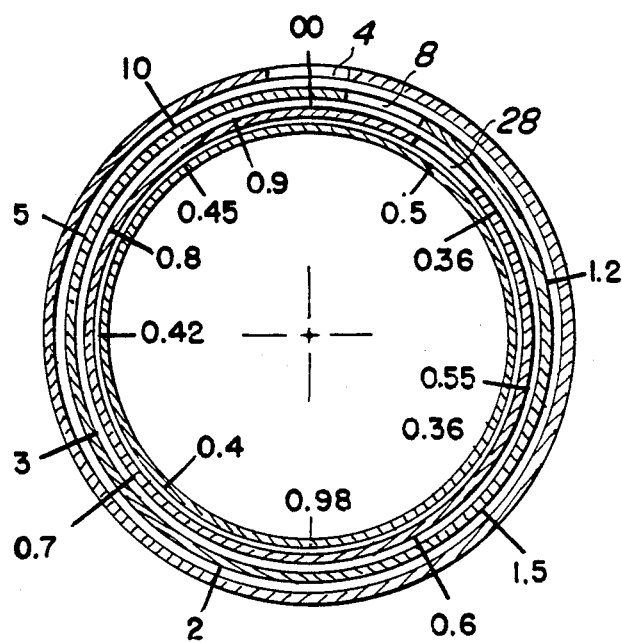
Figure 9A:
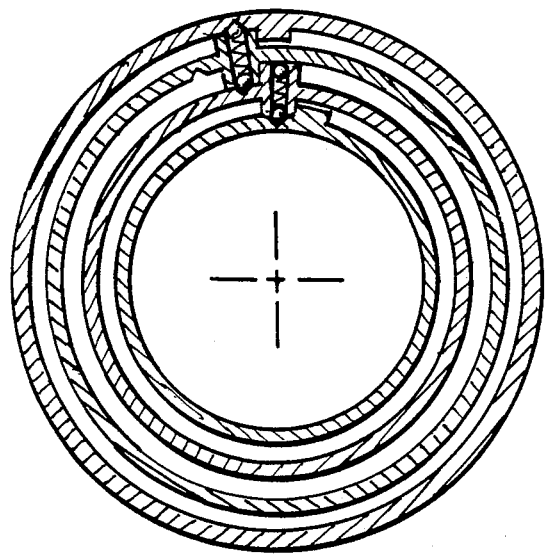
Figure 9B:
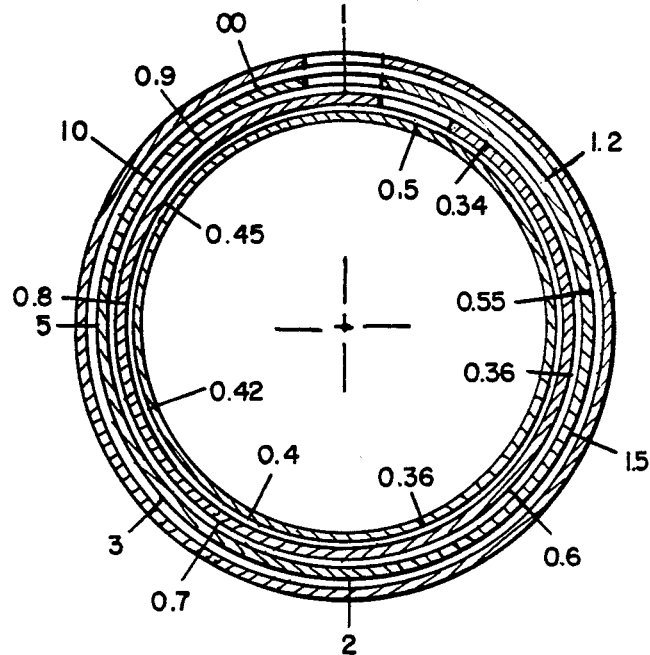
Figure 10A:
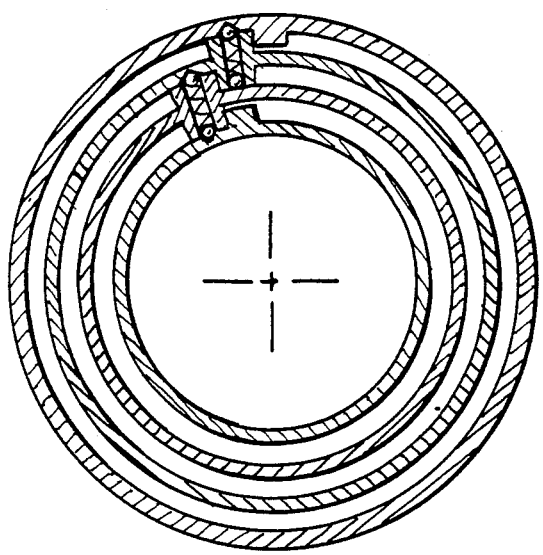
Figure 10B:
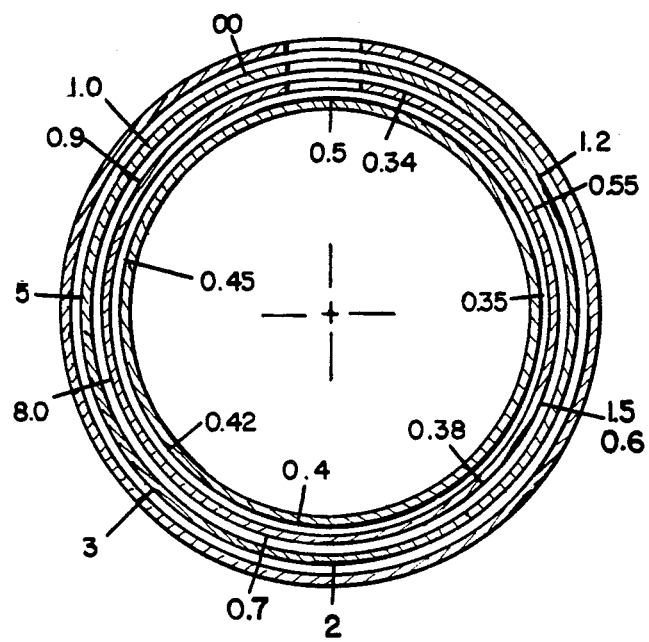
Figure 11A:
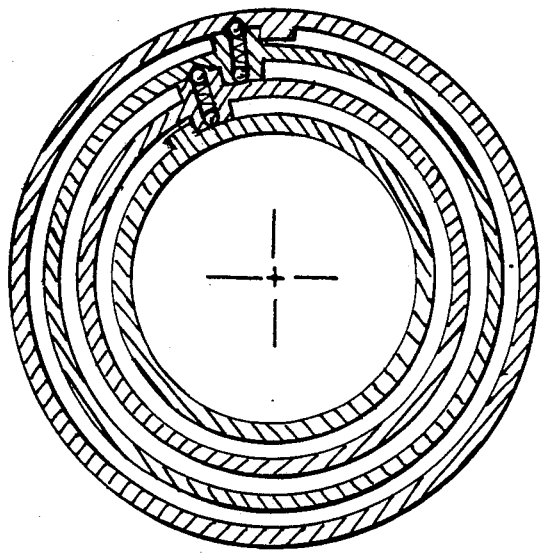
Figure 11B:
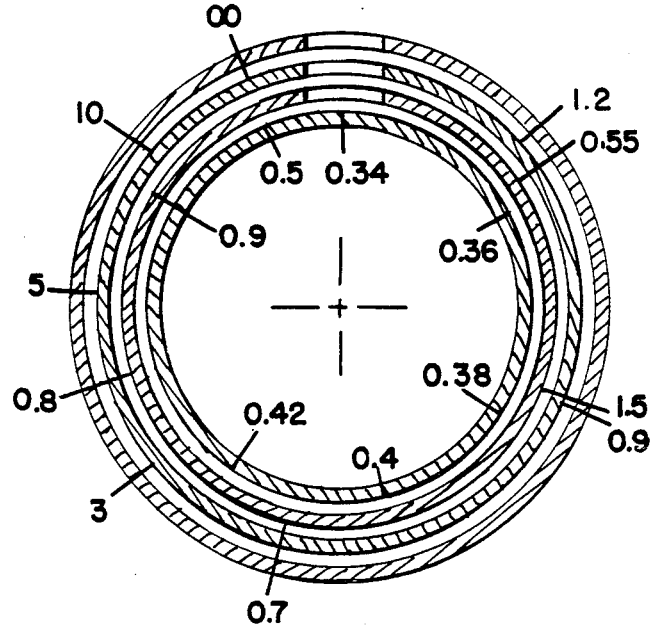

The embodiment shown in FIGS. 8 to 11 includes another distance setting ring 25 located between the radially outer distance setting ring 5 and the radially inner distance setting ring 9. The radially inner distance setting ring 9 is rotated manually by means of a driving ring (not shown), in the direction of arrow 27. FIG. 8 shows inner ring 9 being rotatively connected by means of drivers 7 and 26, respectively to the radially outer and inner distance setting rings 5 and 25, so that these rings will also rotate in the direction of arrow 27. The distance scale of outer-most distance setting ring 5 appears first in control window 4 of the mount. At the time when driver 7 abuts against the stop 12 of mount 3, control window 8 becomes in coincidence beneath control window 4, so that the distance scale on the second distance setting ring 25 becomes visible. This second distance setting ring 25 also has a control window 28, which becomes in coincidence beneath the two control windows 4 and 8 after one rotation when driver 26 is abutting against driver 7 which already abuts stop 12 (FIG. 10). The distance scale mounted on the innermost distance setting ring 9 becomes visible at this point.

Figure 12:
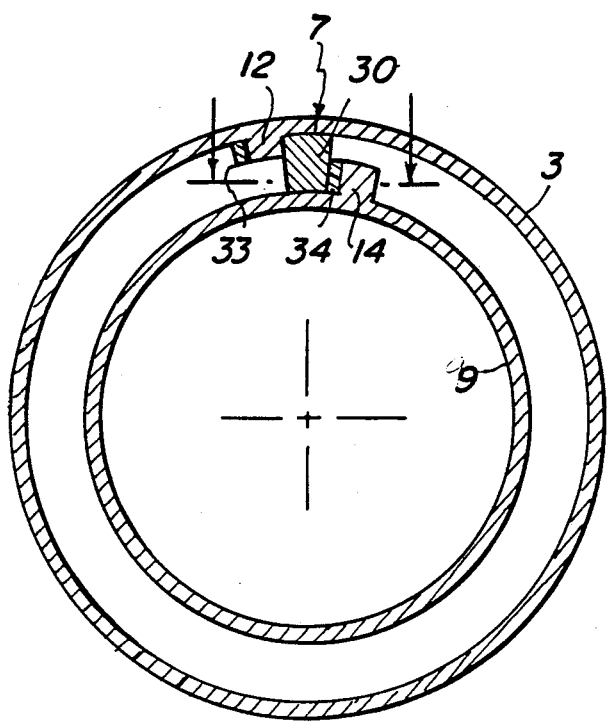
FIG. 12 is a cross-sectional view of the distance setting rings with a driver formed as a magnet.
Figure 13:
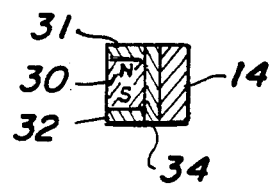
FIG. 13 is a schematic cross-sectional view of the magnet taken along line IV in FIG. 12.

As apparent from FIG. 12, ferromagnetic air guide 33, 34 are connected to stop 12 and stop 14, respectively. The driver 7 which is connected to the radially outer distance setting ring 5 is formed as a permanent magnet 30, which, as seen in FIG. 13, may be provided with pole pieces 31, 32. This magnet forms a magnetic circuit with the air guides and brings about the entrainment of the pieces.

Although only a few embodiments have been discussed in detail above, those having ordinary skill will certainly understand that many modifications are possible. Such modifications are intended to be encompassed within the following claims.

What is claimed is:

1. A lens system using a radially adjustable distance finder comprising:
   a lens mount having inner surfaces defining an inwardly protruding first projection;
   first distance setting means which is rotatable to set a distance, located inside said lens mount;
   second distance setting means located inside said first distance setting means, formed with an outer surface defining an outwardly projecting second projection;
   means for setting a distance by rotating said second distance setting means;
   projection mating means rigidly coupled to said first distance setting means, for preventing said first distance setting means from passing either said first or second projection, and
   maintaining means for maintaining said projection mating means in a first location until said projection mating means contacts one of said projections, and for automatically releasing said first location in response to a force produced by said mating means.

2. A lens system as in claim 1 wherein said first and second distance setting means are each formed with an outer surface having a distance scale printed thereon.

3. A lens system as in claim 2 wherein said lens mount is formed with a control window to view said distance scale imprinted on said first distance setting means, and said first distance setting means also has a control window which lines up with said control window in said lens mount when said projection mating means mates with said first projection when said first distance setting means has rotated by a predetermined amount.

4. A lens system as in claim 1 wherein said first distance setting means comprises a first distance setting ring and a second distance setting ring, coaxial with one another, and wherein said projection mating means comprises a first driver structure coupled to said first distance setting ring and a second driver structure coupled to said second distance setting ring, said driver structures each adapted to mate with said first and second projections, respectively, and to mate with each other.

5. A lens system as in claim 4 wherein said first and second distance setting means are each formed with an outer surface having a distance scale printed thereon.

6. A lens system as in claim 5 wherein said lens mount is formed with a control window to view said distance scale on said first distance setting means, and said first distance setting means also has a control window which lines up with said control window in said lens mount when said projection mating means contacts said first projection when said first distance setting means has rotated by a predetermined amount.

7. A lens system as in claim 4 wherein said maintaining means comprises a spring biased ball which couples with a concave notch formed on an inner surface of said lens mount.

8. A lens system as in claim 1 wherein said maintaining means comprises a spring biased ball which couples with a concave notch formed on an inner surface of said lens mount.

9. A lens system as in claim 1 wherein said maintaining means comprises a spring biased ball mating with a concave notch on said outer surface of said second distance setting means.

10. A macrolens assembly comprising:
a lens mount;
a least two distance setting rings each having a scale coaxial to the lens axis, arranged inside the mount with a second distance setting ring inside a first distance setting ring;
first means for coupling only said second distance setting ring to an exterior of said lens mount to form a driving ring;
second means for rotatively coupling said first distance setting ring to the second distance setting ring and for automatically releasing in response to a radial pressure; and
control windows, formed both in the lens mount and the first distance setting ring for viewing said scales.

11. The macrolens assembly as set forth in claim 10; further comprising a first notch formed on an outer surface of said second distance setting ring, wherein said lens mount includes a second notch formed on an inner surface thereof, and wherein said second coupling means includes a ball catch rigidly secured to said first distance setting the ring; said lens mount further includes a radially inwardly stop projection; said second distance setting ring further includes a radially outwardly stop projection; in an initial position, said ball catch acting bilaterally in the radial direction, locking into said first notch, and being disposed between said projections and in contact therewith; said second notch being staggered to the first notch by a distance corresponding to the width of the control windows.

12. The macrolens assembly as set forth in claim 10 wherein said control windows are staggered one directly behind the other in one direction of rotation of the distance setting rings.

13. The macrolens assembly as set forth in claim 10 wherein said second coupling means is formed as a permanent magnet which, together with its pole pieces, is connected to the first distance setting ring adjacent to the mount; and further comprising air guides formed from ferromagnetic material, which are mounted on respective stop projections, wherein one of said stop projections is integrally formed on an interior surface of said mount and another of which is integrally formed on an outer surface of said second distance setting ring.

14. The macrolens assembly as set forth in claim 10, further comprising a third distance setting ring, said third distance setting ring being rotatably connected by means of drivers to the second distance setting ring.

15. A lens system using a radially adjustable distance finder, comprising:
a lens mount, having inner surfaces defining an inwardly protruding first projection, and a substantially concave notch on one side of said first projection;
a first, outer, distance setting ring, mounted coaxially with, and within, said lens mount for rotating to adjust a distance setting, said first distance setting ring having a distance scale printed on an outer surface thereof, said lens mount formed with an observation window on a portion thereof, said first distance setting ring formed with an observation window on a portion thereof;
a driver structure, rigidly coupled to said first distance setting ring, and having a spring biased ball adapted to mate with said notch, said observation windows being located such that when said driver structure is mated with said notch, said observation window of said first distance setting ring becomes in registry with said observation window of said lens mount when said first distance setting ring has rotated by a predetermined amount; and
a second distance setting ring having outer surfaces that define a second notch and a second projection, said second projection also adapted to mate with said driver structure to prevent further rotation of said second distance setting ring past a certain point.

* * * * *